US010968987B2

(12) United States Patent
Oishi

(10) Patent No.: US 10,968,987 B2
(45) Date of Patent: Apr. 6, 2021

(54) AUTO TENSIONER PROVIDED IN AUXILIARY DEVICE DRIVE BELT SYSTEM

(71) Applicant: Mitsuboshi Belting Ltd., Kobe (JP)

(72) Inventor: Satoshi Oishi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 16/312,525

(22) PCT Filed: Jun. 26, 2017

(86) PCT No.: PCT/JP2017/023412
§ 371 (c)(1),
(2) Date: Dec. 21, 2018

(87) PCT Pub. No.: WO2018/003746
PCT Pub. Date: Jan. 4, 2018

(65) Prior Publication Data
US 2020/0208717 A1 Jul. 2, 2020

(30) Foreign Application Priority Data

Jun. 27, 2016 (JP) .............................. JP2016-126315
Jun. 8, 2017 (JP) .............................. JP2017-113115

(51) Int. Cl.
*F16H 7/12* (2006.01)
*F16H 7/08* (2006.01)

(52) U.S. Cl.
CPC ......... *F16H 7/1218* (2013.01); *F16H 7/0831* (2013.01); *F16H 2007/081* (2013.01);
(Continued)

(58) Field of Classification Search
CPC ..... F16H 2007/0865; F16H 2007/0863; F16H 7/1218; F16H 7/1209; F16H 7/0831;
(Continued)

(56) References Cited

U.S. PATENT DOCUMENTS 5,632,697 A * 5/1997 Serkh .................... F16H 7/1218
474/109
5,647,813 A * 7/1997 Serkh .................... F16H 7/1218
474/135
(Continued)

FOREIGN PATENT DOCUMENTS

CN 1302360 A 7/2001
CN 1454300 A 11/2003
(Continued)

OTHER PUBLICATIONS

Aug. 28, 2019—(CA) Office Action—App 3,023,428.
(Continued)

Primary Examiner — Michael R Mansen
Assistant Examiner — Raveen J Dias
(74) Attorney, Agent, or Firm — Banner & Witcoff, Ltd.

(57) ABSTRACT

The present invention pertains to an auto tensioner (1) to be provided in an auxiliary-driving belt system, including a friction member (6) that is sandwiched between an arm (3) and an inner circumferential surface of an outer cylindrical portion (21) of a base (2) in the radial direction of the outer cylindrical portion (21) and that has an arc-shaped surface (60) locked to the arm (2) and slidable with respect to the inner circumferential surface of the outer cylindrical portion (21), in which the friction member (6) is provided so that the arc-shaped surface (60) remains at a height equal to or higher than a horizontal plane (HP) passing through a central axis (R) when sliding with respect to the inner circumferential surface of the outer cylindrical portion (21) as the arm (3) oscillates.

3 Claims, 9 Drawing Sheets

(52) U.S. Cl.
CPC ............... *F16H 2007/0865* (2013.01); *F16H 2007/0893* (2013.01)

(58) Field of Classification Search
CPC ............ F16H 7/0829; F16H 2007/084; F16H 2007/081; F16H 2007/0893; F16H 7/08
See application file for complete search history.

(56) References Cited

U.S. PATENT DOCUMENTS

| | | | |
|---|---|---|---|
| 5,938,552 A | 8/1999 | Serkh | |
| 5,964,674 A | 10/1999 | Serkh et al. | |
| 6,497,632 B2* | 12/2002 | Ayukawa | F16H 7/1218 474/135 |
| 6,609,988 B1* | 8/2003 | Liu | F16H 7/1218 474/133 |
| 7,985,151 B2* | 7/2011 | Singer | F16H 7/1281 474/135 |
| 2002/0010045 A1* | 1/2002 | Serkh | F16H 7/1218 474/135 |
| 2002/0016231 A1 | 2/2002 | Serkh | |
| 2003/0216204 A1* | 11/2003 | Serkh | F16H 7/1218 474/135 |
| 2007/0249446 A1* | 10/2007 | Hao | F16H 7/1218 474/135 |
| 2009/0082146 A1 | 3/2009 | Singer | |
| 2010/0105508 A1* | 4/2010 | Mennerat | F16H 7/1218 474/135 |
| 2010/0184546 A1* | 7/2010 | Singer | F16H 7/1218 474/135 |
| 2011/0015017 A1* | 1/2011 | Serkh | F16H 7/1218 474/135 |
| 2011/0177897 A1* | 7/2011 | Ward | F16H 7/1209 474/135 |
| 2011/0201466 A1 | 8/2011 | Ishida et al. | |
| 2011/0312455 A1* | 12/2011 | Lannutti | F16H 7/1218 474/135 |
| 2012/0028744 A1* | 2/2012 | Hartmann | F16H 7/1218 474/135 |
| 2014/0287858 A1* | 9/2014 | Hao | F16H 7/1218 474/133 |
| 2015/0276024 A1* | 10/2015 | Jiang | F16H 7/1218 474/135 |
| 2017/0016517 A1* | 1/2017 | Ward | F16H 7/1218 |
| 2017/0059015 A1 | 3/2017 | Oishi et al. | |
| 2019/0203810 A1* | 7/2019 | Hodjat | F16H 7/08 |
| 2019/0249758 A1* | 8/2019 | Singh | F02B 67/06 |

FOREIGN PATENT DOCUMENTS

| | | |
|---|---|---|
| CN | 101415969 A | 4/2009 |
| CN | 102177367 A | 9/2011 |
| CN | 102414477 A | 4/2012 |
| DE | 102009052637 A1 | 5/2011 |
| JP | H10-274296 A | 10/1998 |
| JP | 2003-083405 A | 3/2003 |
| JP | 2006-057743 A | 3/2006 |
| JP | 2006-162006 A | 6/2006 |
| JP | 2011-007273 A | 1/2011 |
| JP | 5276520 B2 | 8/2013 |
| JP | 2016-008666 A | 1/2016 |
| TW | 201544738 A | 12/2015 |
| WO | 2015-125691 A | 8/2015 |

OTHER PUBLICATIONS

Jan. 10, 2020—(IN) Examination Report—App 201817042011.
Apr. 27, 2018—(TW) Office Action—App 106121412—Eng Tran.
Sep. 14, 2017—International Search Report—Intl App PCT/JP2017/023412.
Jan. 29, 2020—(CA) Office Action—App 3,023,428.
Mar. 2, 2020—(EP) Extended Search Report—App 17820101.8.
Feb. 18, 2020—(KR) Office Action—App 10-2018-7037119.
Oct. 7, 2020—(KR) Decision to Refuse a Patent—App 10-2018-7037119.
Nov. 5, 2020—(KR) Reexamination Decision to Refuse a Patent—App 10-2018-7037119.
Dec. 8, 2020—(EP) Office Action—App 17820101.8.
Jan. 25, 2021—(KR) Office Action—App 10-2020-7034596.
Feb. 3, 2021—(CN) Notification of First Office Action—App 201780039779.X.

* cited by examiner

[FIG. 1]
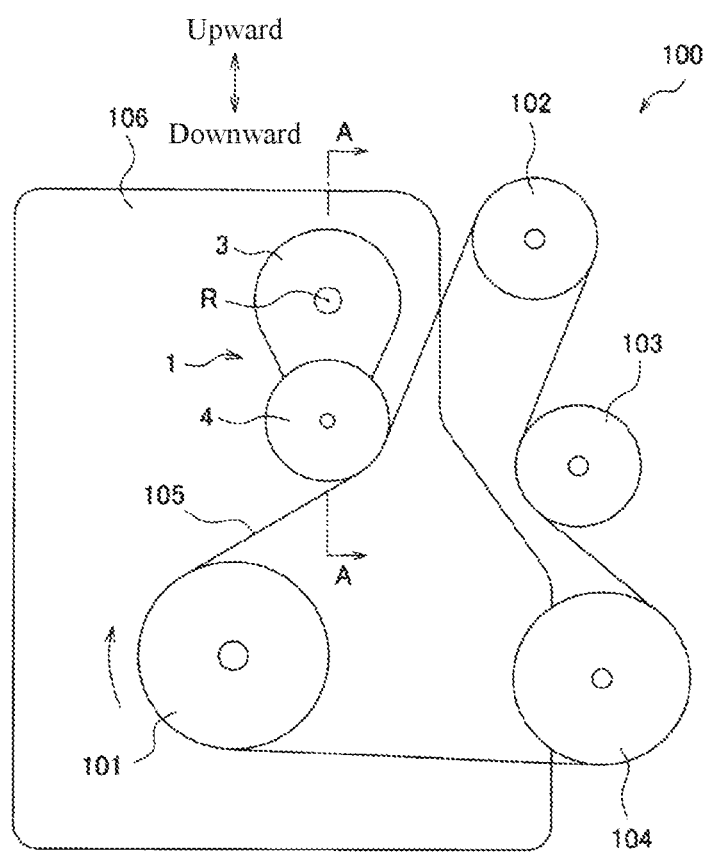

[FIG. 2]
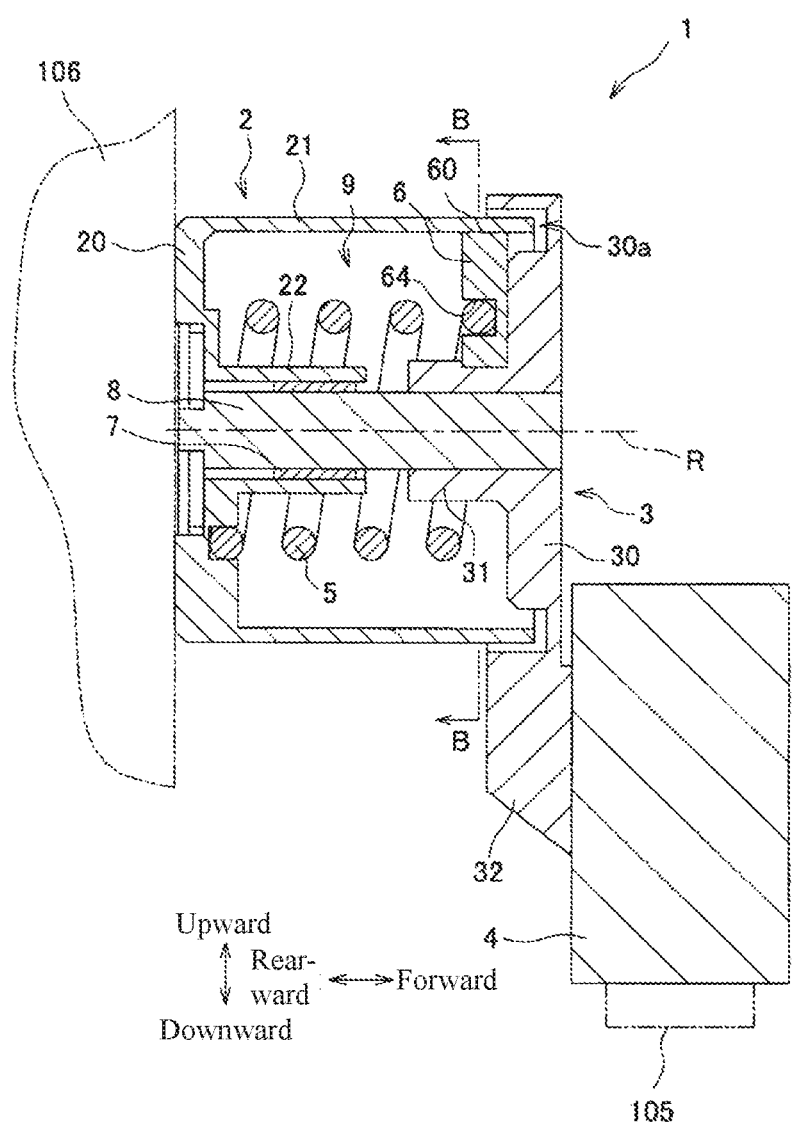

[FIG. 3]
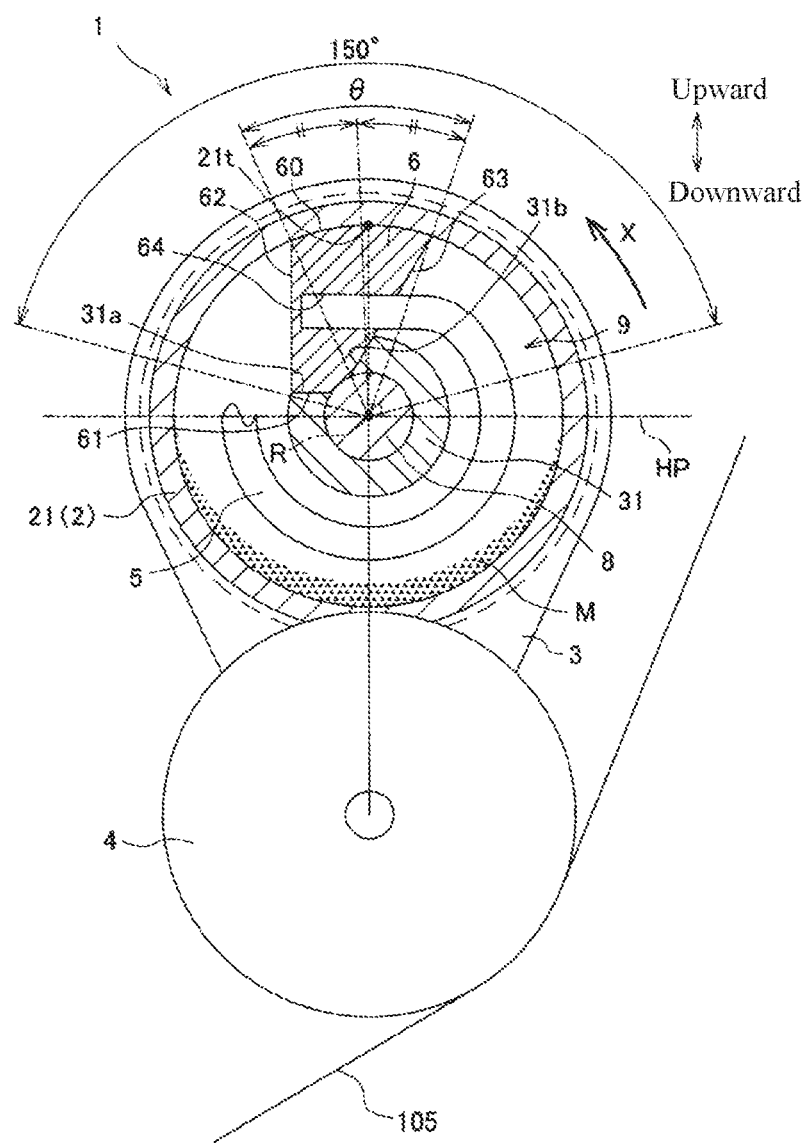

[FIG. 4]
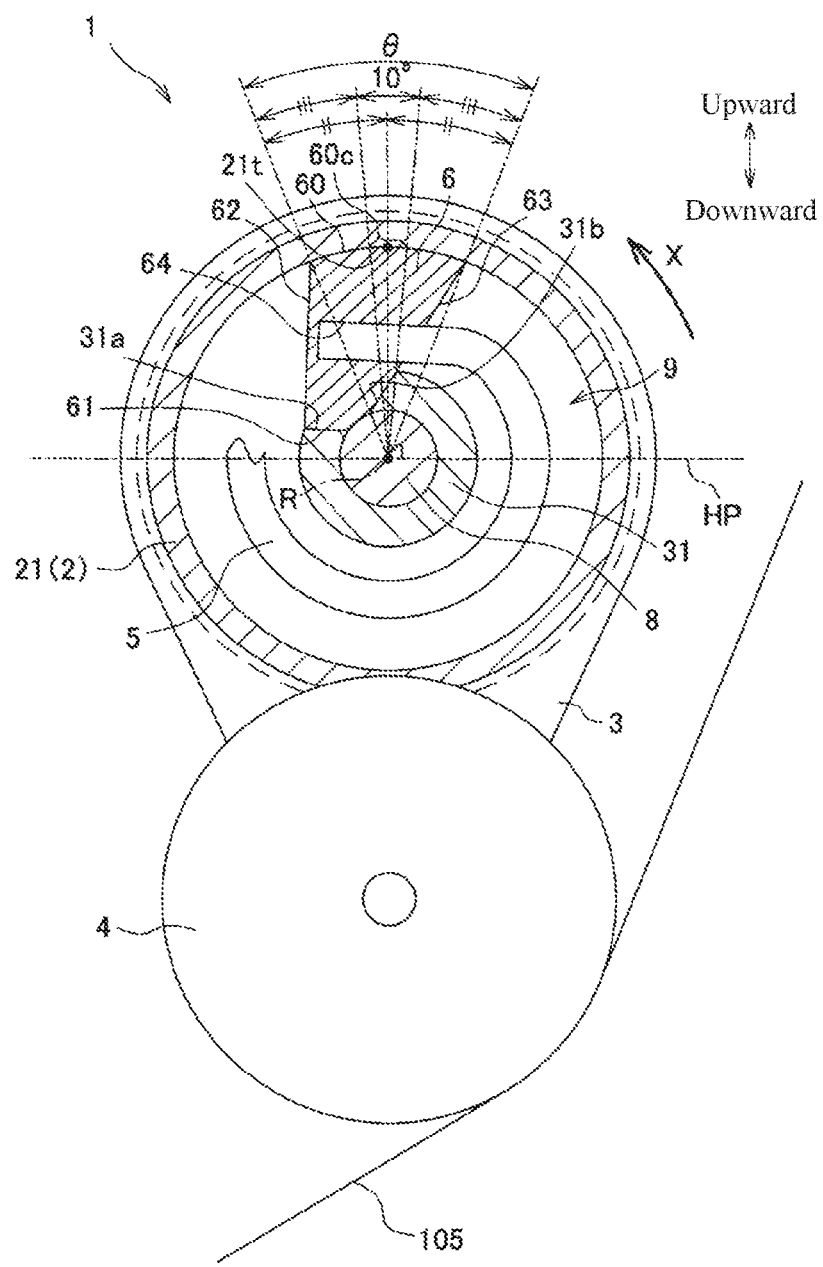

[FIG. 5]
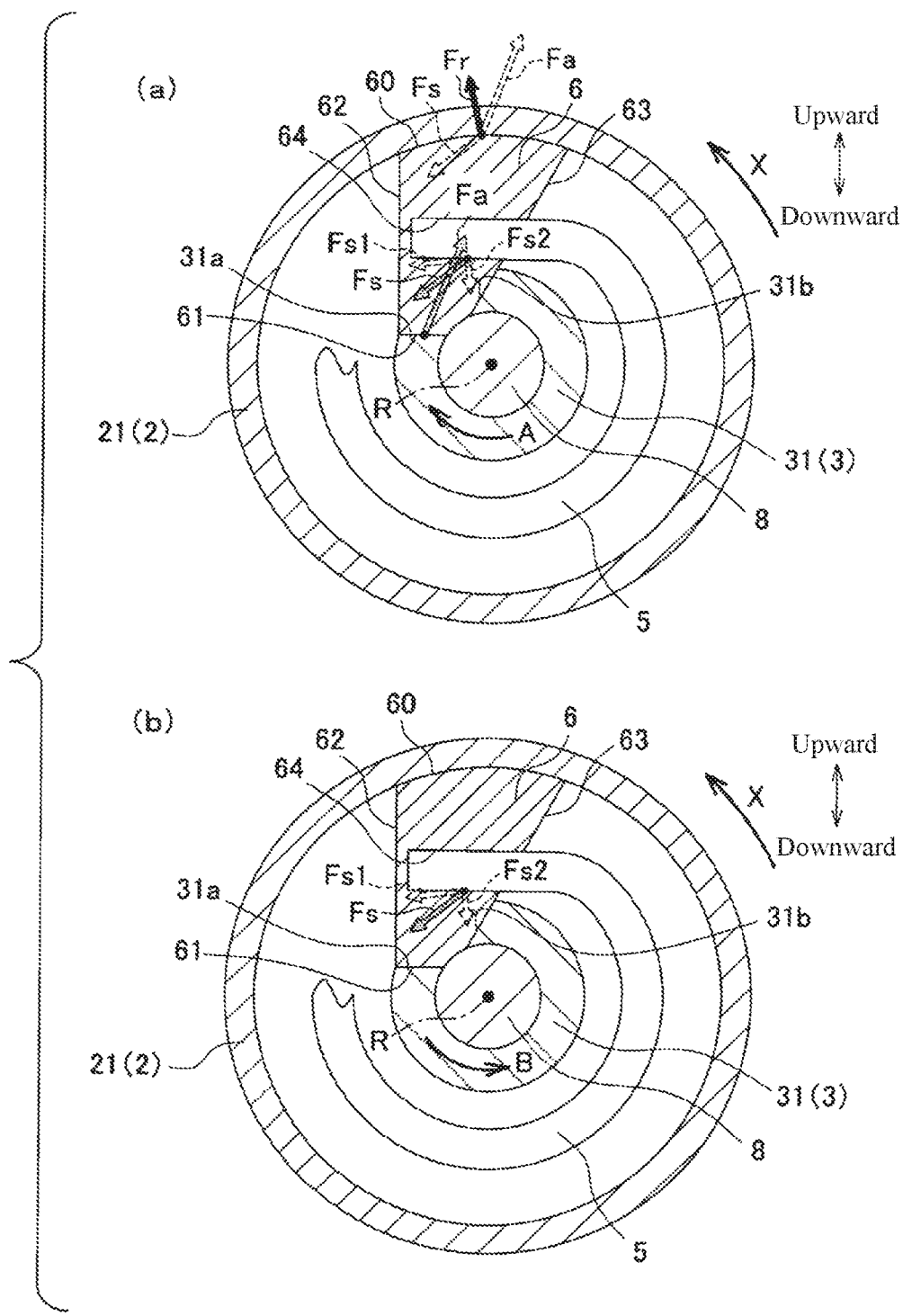

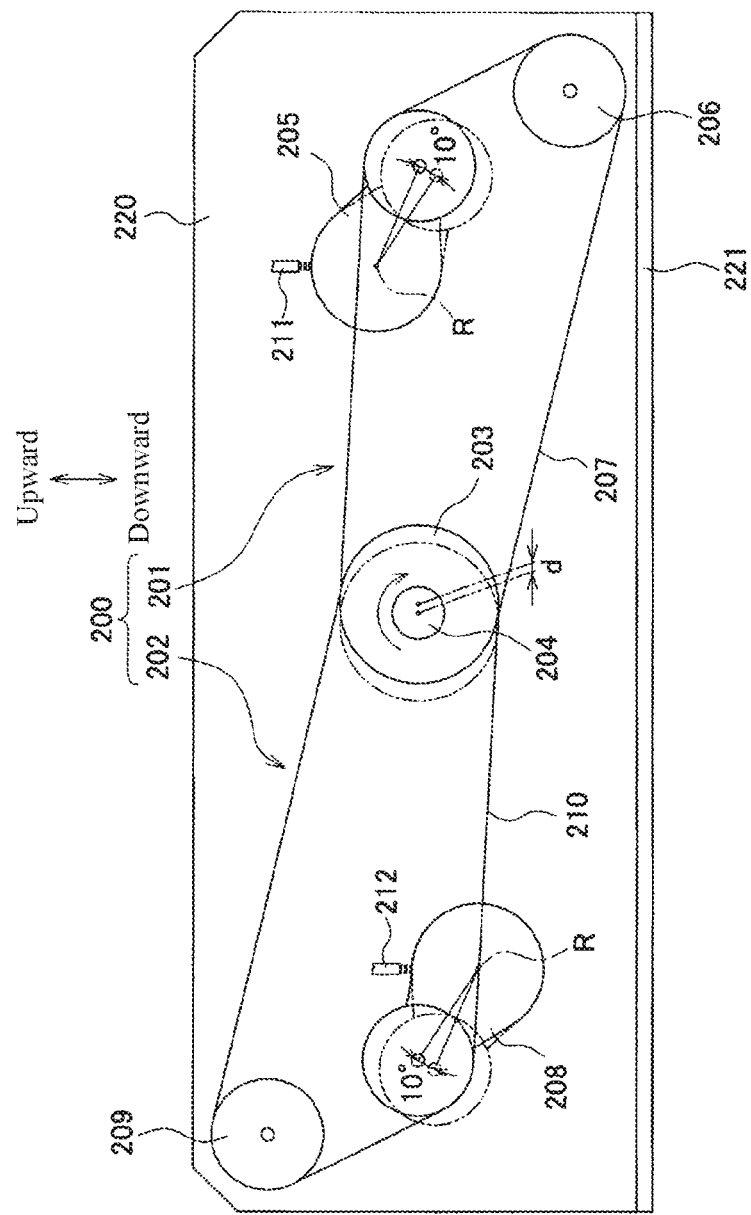
[FIG. 6]

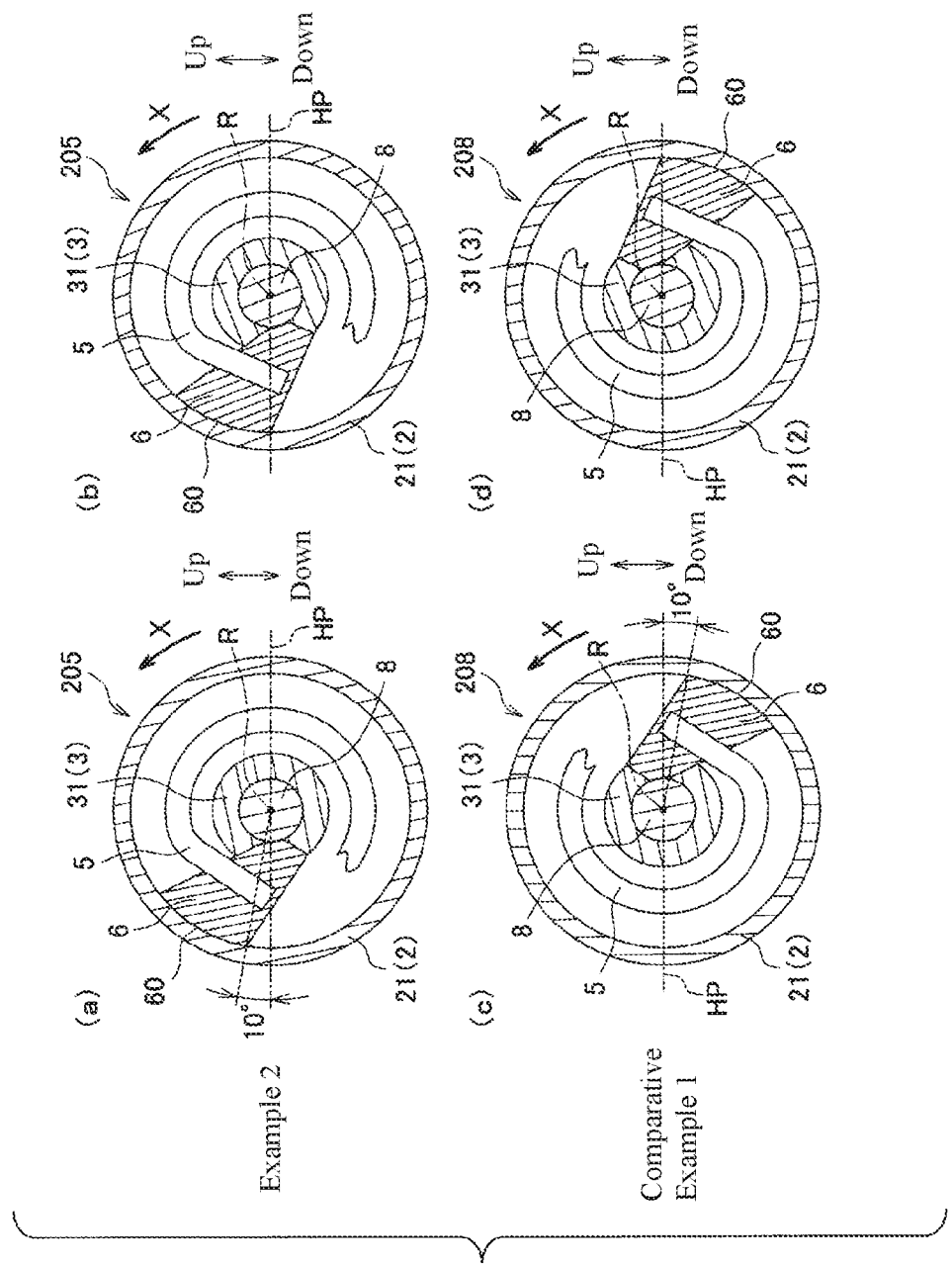
[FIG. 7]

[FIG. 8]
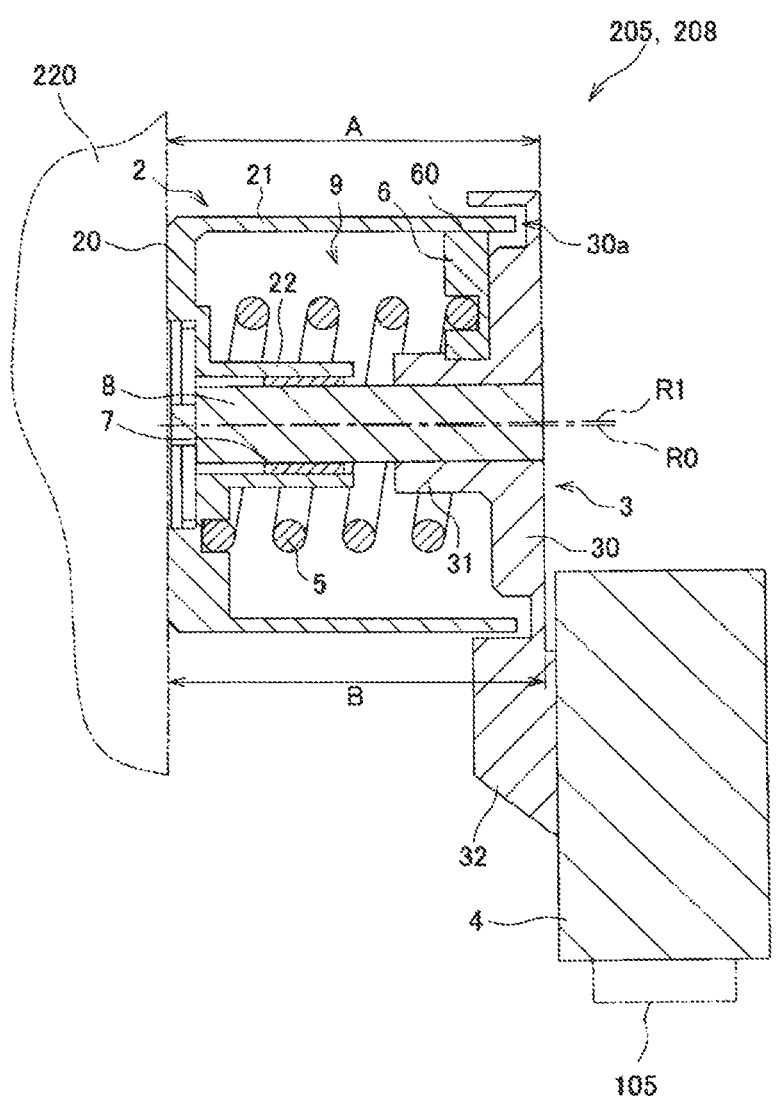

[FIG. 9]
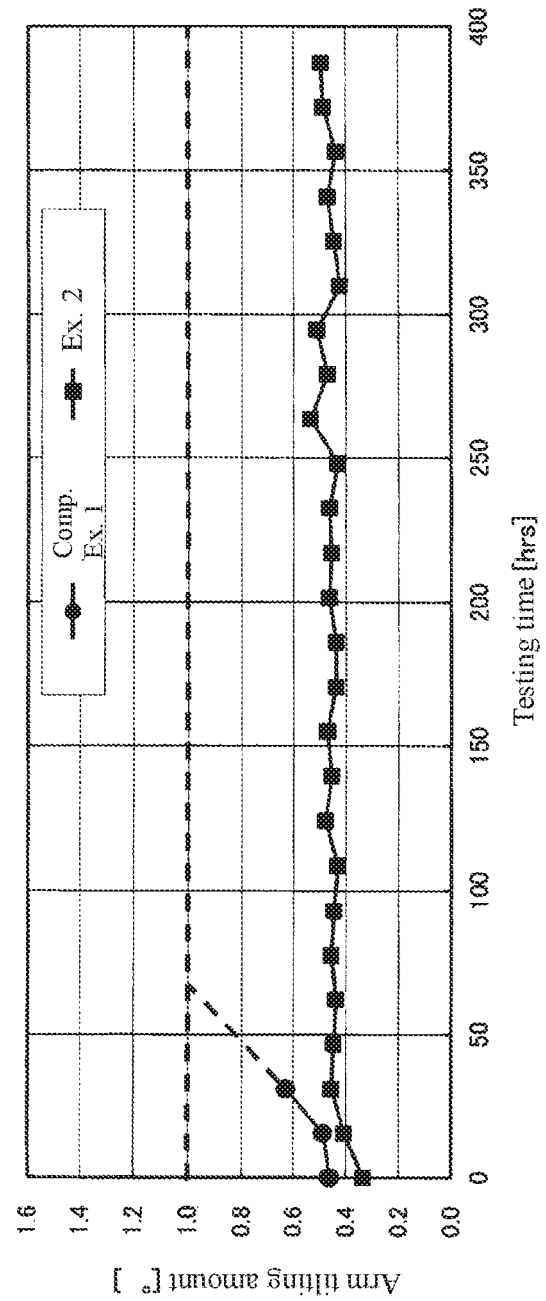

AUTO TENSIONER PROVIDED IN AUXILIARY DEVICE DRIVE BELT SYSTEM

CROSS REFERENCE TO RELATED APPLICATIONS

This is a U.S. National Phase Application under 35 U.S.C. § 371 of International Application No. PCT/JP2017/023412, filed Jun. 26, 2017, which claims priority to Japanese Application Nos. 2016-126315, filed Jun. 27, 2016 and 2017-113115, filed Jun. 8, 2017, which was published Under PCT Article 21(2), the entire contents of which are incorporated herein by reference.

TECHNICAL FIELD

The present invention relates to an auto tensioner to be provided in an auxiliary-driving belt system for driving auxiliaries of an automobile engine.

BACKGROUND ART

In a belt for driving auxiliaries of an automobile engine, belt tension fluctuates due to a fluctuation in rotation caused by the combustion of the engine. A belt slip is caused by the fluctuation in belt tension, causing a problem with slipping noise or abrasion. To solve the problem, conventionally, an auto tensioner has been adopted as a mechanism for suppressing the generation of belt slip by automatically maintaining the belt tension at an appropriate level even though the belt tension fluctuates.

A damping mechanism (a damping mechanism) is provided in an auto tensioner provided in an auxiliary-driving belt system for an automobile engine, for sufficiently damping the vibration of a movable member (hereinafter, referred to as an arm) that is supported rotatably on a fixed member (hereinafter, referred to as a base) particularly when the tension of a belt is increased. So-called dry damping mechanisms, which are disclosed in, for example, PTLs 1 and 2, are adopted on many occasions as such a damping mechanism. In such dry damping mechanisms, a friction member, functioning as a damping generating member, is provided between a base and an arm while being locked on the arm, and a frictional action is generated on sliding surfaces of the friction member and the base to thereby damp the oscillation of the arm.

The friction member of PTL 1 is locked on the arm and is sandwiched between the base and the arm in a radial direction. When viewed in the direction of an oscillating axis of the arm, the friction member has substantially a fan shape. A sliding surface of the friction member of PTL 1 is formed into an arc surface capable of being brought into sliding contact with an inner circumferential surface of an outer cylindrical portion of the base.

The friction member of PTL 2 is locked on the arm and is pressed against the base (to describe this in detail, against a friction member-mounting plate fixed to the base) with a coil spring that is compressed in the direction of an oscillating axis of the arm. When viewed in an axial direction, the friction member has an annular shape. A sliding surface of the friction member of PTL 2 is formed into an annular surface capable of being brought into sliding contact with the base (the friction member-mounting plate).

In the auto tensioner provided in an auxiliary-driving belt system for an automobile engine, the arm oscillates violently as the tension of the belt fluctuates. The friction member slides violently on the base as the arm so oscillates. The friction member, which is the damping generating member, wears gradually and abrades away due to frictional actions that are generated repeatedly on the sliding surface. In the event that at least part of the sliding surface of the friction member wears early, it becomes difficult to ensure the effect of damping the oscillation of the arm, leading to a risk that the service life of the auto tensioner is reached early. Additionally, due to the wear of the sliding surface of the friction member, a bearing for an oscillation shaft also bears an unbalanced load applied on a side facing the sliding surface (worn surface) of the friction member when viewed in an axial direction, causing an uneven wear, and the arm tilts in that direction. When the arm tilts remarkably (e.g., when exceeding 1°), a remarkable misalignment is generated in the auxiliary-driving belt system. Due to this, a great lateral pressure is applied from a tensioner pulley, and if the worst happens, the belt is dislocated from the tensioner pulley, leading to a risk that the service life of the auto tensioner is reached early.

In addition, the auto tensioner provided in an auxiliary-driving belt system for an automobile engine may be splashed with a water medium such as muddy water. For example, as in the embodiments disclosed in PTLs 1 and 2, a water medium such as muddy water may enter from an annular gap formed between the cylindrical portion (a front end portion on an opening side) of the base and the arm in some cases. Due to this, depending upon a case, foreign matters contained in the water medium such as muddy water are interposed between the sliding surface of the friction member and the base. Even though a friction member having a superior wear resistance is adopted as a damping generating member, the sliding surface of the friction member wears early due to the interposition of the foreign matters as compared with the case where no such foreign matters are interposed. This causes the problem described above, as a result of which, there is a risk that the service life of the auto tensioner is reached early.

As a countermeasure against the problem, it has been known that foreign matters can be prevented from entering an interior of a main body of an auto tensioner from an exterior by disposing a seal member in a path (the annular gap described above) from which a water medium such as muddy water enters (e.g., PTLs 3 and 4).

CITATION LIST

Patent Literature

PTL 1: WO 2015-125691
PTL 2: JP-A 2003-083405
PTL 3: JP-A 2006-162006
PTL 4: JP-A 2006-057743

SUMMARY OF INVENTION

Technical Problem

With auto tensioner of PTLs 3 or 4, the problem in that the foreign matters are interposed between a sliding surface of a friction member and a base can be solved. On the other hand, a seal member needs to be designed exclusively regarding its material and shape with sufficient consideration so as not, as far as possible, to give any resistance to an oscillating motion of an arm while ensuring the durability. Thus, the production cost of the auto tensioner is increased accordingly.

Then, the present invention has been made in view of the problem described above, and an object of the present invention is to provide an auto tensioner to be provided in an auxiliary-driving belt system, configured to suppress an early wear of sliding surfaces of a friction member by preventing a foreign matter from being interposed between the sliding surface of the friction member and the mating surface without a seal member, to ensure the durability of the auto tensioner.

Solution to Problem

An auto tensioner to be provided in an auxiliary-driving belt system, according to the present invention, has the following characteristics.

Namely, an auto tensioner to be provided in an auxiliary-driving belt system, according to the present invention, including: a base having a cylindrical portion; an arm supported on the base so as to be rotatable about a center axis of an inner circumferential surface of the cylindrical portion; a tensioner pulley provided on the arm so as to be rotatable and configured to be wound with a belt; a friction member locked on the arm while being sandwiched between the inner circumferential surface of the cylindrical portion and the arm in a radial direction of the cylindrical portion, and having an arc-shaped surface configured to be slidable on the inner circumferential surface of the cylindrical portion; and a coil spring configured to rotationally bias the arm in one direction with respect to the base, in which when the arm oscillates due to a fluctuation of tension of the belt wound around the tensioner pulley, the oscillation of the arm is damped by generating a frictional force between the arc-shaped surface and the inner circumferential surface of the cylindrical portion.

In the auto tensioner to be provided in an auxiliary-driving belt system, the friction member is provided so that the arc-shaped surface remains at a height equal to or higher than a horizontal plane passing through the center axis when it slides on the inner circumferential surface of the cylindrical portion as the arm oscillates.

According to this configuration, the friction member, which is a damping generating member locked on the arm, is provided so that the arc-shaped surface (sliding surface) of the friction member remains at a height equal to or higher than the horizontal plane passing through the center axis of the inner circumferential surface of the cylindrical portion of the base when it slides on the mating surface (inner circumferential surface of the cylindrical portion of the base) as the arm oscillates.

Normally, in an auto tensioner provided in an auxiliary-driving belt system, although an arm oscillates violently, an oscillation width of the arm itself is relatively small (a maximum of about 10°). Therefore, it is feasible to provide the friction member so that the arc-shaped surface (sliding surface) thereof remains at a height equal to or higher than the horizontal plane passing through the center axis of the inner circumferential surface of the cylindrical portion of the base when the arm oscillates.

In general, a base of an auto tensioner is fixed to a substantially vertical surface of an engine block or the like. Therefore, foreign matters, which is contained in a water medium such as muddy water that enters from a gap defined between the cylindrical portion of the base and the arm under an environment where the auto tensioner is splashed with the water medium such as muddy water, are not accumulated on a portion situated upper than the horizontal plane that passes through the center axis in the inner circumferential surface of the cylindrical portion of the base. However, the foreign matters are accumulated on a portion that is situated lower than the horizontal plane that passes through the center axis.

Consequently, the foreign matters can be prevented from being interposed between the arc-shaped surface (sliding surface) of the friction member and the inner circumferential surface of the cylindrical portion of the base. As a result, an early wear of the arc-shaped surface (sliding surface) of the friction member can be suppressed without providing a seal member, whereby the durability of the auto tensioner can be ensured.

In the auto tensioner to be provided in an auxiliary-driving belt system, according to the present invention, it is preferable that the arc-shaped surface has a center angle of smaller than 150° when viewed in a direction of the center axis, and the friction member is provided so that the uppermost portion of the inner circumferential surface of the cylindrical portion is brought into contact with an area that constitutes a central portion of the arc-shaped surface and whose center angle is 10° when viewed in the direction of the center axis, at a point in time when a predetermined initial tension is applied on the belt.

In the case where the belt is a type having a projection configured to be brought into engagement with a groove of a pulley, such as a V-ribbed belt or a toothed belt, a belt tension is decreased from a moment where the initial tension is applied and is thereafter stabilized. The initial tension is set on the premise that the belt has a standard dimension. However, a belt length varies within a permissible value when the belt is produced. The initial tension becomes higher as the belt length is shorter than the standard dimension, and a tension resulting after stabilization also remains higher.

Even though the belt tension is decreased after the initial tension is applied and though the belt length varies, the position of the friction member in the state where the belt tension is stabilized remains within a range of about ±5° about the center axis from the position of the friction member at the point in time when the predetermined initial tension is applied on the belt of the standard dimension. Furthermore, an oscillation width of the arm is generally 10° or smaller.

According to the present invention, the center angle of the arc-shaped surface is smaller than 150° when viewed in the direction of the center axis, and the friction member is provided so that the uppermost portion of the inner circumferential surface of the cylindrical portion of the base is brought into contact with the area that constitutes the central portion of the arc-shaped surface and whose center angle is 10° when viewed in the direction of the center axis, at a point in time when the predetermined initial tension is applied on the belt. This can reliably realize the configuration in which the arc-shaped surface of the friction member remains at the height equal to or higher than the horizontal plane that passes through the center axis when the arm oscillates. Additionally, even though the belt tension is decreased after the initial tension is applied and though the belt length varies, a middle position of the arc-shaped surface of the friction member when viewed in the direction of the center axis can be positioned near the uppermost portion of the inner circumferential surface of the cylindrical portion of the base when the arm oscillates. In a comparison where the length of an arc of the arc-shaped surface remains the same, a lowermost end of the arc-shaped surface becomes higher as the middle position of the arc-shaped surface becomes nearer to the uppermost portion of the inner circumferential surface of the cylindrical portion. As the lowermost end of the arc-shaped surface becomes higher, it becomes more difficult for foreign matters to enter a gap between the arc-shaped surface and the inner circumferential surface of the cylindrical portion of the base, and even though they enter, they are easily swept out downward. Consequently, the interposition of foreign matters between the arc-shaped surface (sliding surface) of the friction member and the inner circumferential surface of the cylindrical portion of the base can be prevented more reliably.

Advantageous Effects of Invention

According to the configuration described heretofore, an auto tensioner to be provided in an auxiliary-driving belt system, capable of suppressing an early wear of the sliding surface of the friction member by preventing the interposition of foreign matters between the sliding surfaces of the friction member and the mating surface without providing any seal member, to thereby ensure the durability of the auto tensioner, can be provided.

BRIEF DESCRIPTION OF DRAWINGS

FIG. 1 is a configuration diagram of an auxiliary-driving belt system according to an embodiment of the present invention.

FIG. 2 is a cross-sectional view taken along a line A-A in FIG. 1.

FIG. 3 is a drawing combining FIG. 1 and a cross-sectional view taken along a line B-B in FIG. 2, illustrating a state in which belt tension is stable.

FIG. 4 is a drawing combining FIG. 1 and the cross-sectional view taken along the line B-B in FIG. 2, illustrating a state in which an initial tension is applied.

(a) of FIG. 5 is a drawing illustrating a force acting on a friction member when the belt tension is increased; and (b) of FIG. 5 is a drawing illustrating a force acting on the friction member when the belt tension is decreased.

FIG. 6 is a configuration diagram of a test belt system.

(a) of FIG. 7 is a drawing illustrating a state in which the friction member slides as a result of an increase in belt tension in a first belt system; (b) of FIG. 7 is a drawing illustrating a state in which the friction member slides as a result of a decrease in the belt tension in the first belt system; (c) of FIG. 7 is a drawing illustrating a state in which the friction member slides as a result of an increase in belt tension in a second belt system; and (d) of FIG. 7 is a drawing illustrating a state in which the friction member slides as a result of a decrease in the belt tension in the second belt system.

FIG. 8 is a drawing for explaining a calculation method of arm tilting amount.

FIG. 9 is a graph showing relationships between arm tilting amount and testing time in Example 2 and Comparison Example 1.

DESCRIPTION OF EMBODIMENTS

Next, an embodiment of the present invention will be described. FIG. 1 illustrates an example of an auxiliary-driving belt system for an automobile engine to which the present invention is applied. An auxiliary-driving belt system 100 includes: a crank pulley 101 fixed to a crankshaft; an ALT pulley 102 connected to an alternator (ALT); a WP pulley 103 connected to a water pump (WP); an AC pulley 104 connected to an air-conditioning compressor (AC); and an auto tensioner 1. An output of an engine is transmitted clockwise from the crank pulley 101, via one belt 105, to the ALT pulley 102, WP pulley 103 and AC pulley 104 to drive the corresponding auxiliaries (alternator, water pump and air-conditioning compressor). The auto tensioner 1 is provided in a belt span between the crank pulley 101 and the ALT pulley 102 in such a way that a tensioner pulley 4 of the auto tensioner 1 is brought into contact with the belt. The belt 105 is a power-transmission belt such as a V-ribbed belt, a V belt, a toothed belt, and a flat belt.

As illustrated in FIG. 2, the auto tensioner 1 includes: a base 2, an arm 3 supported on the base 2 so as to be rotatable about an axis R (center axis); the tensioner pulley 4 provided on the arm 3 so as to be rotatable; a coil spring 5; and a friction member 6. The auto tensioner 1 has a dry damping mechanism configured to damp the oscillation of the arm 3, and the damping mechanism has the friction member 6 as a damping generating member configured to damp the oscillation of the arm 3. A rightward direction in FIG. 2 is defined as a forward direction, and a leftward direction in FIG. 2 is defined as a rearward direction. Additionally, a radial direction about the axis R is simply defined as a radial direction, and a circumferential direction about the axis R is simply defined as a circumferential direction.

The base 2 includes: an annular pedestal portion 20 fixed to an engine block 106; an outer cylindrical portion (cylindrical portion) 21 extending to the front from an outer edge portion of the pedestal portion 20; and an inner cylindrical portion 22 extending to the front from a central portion of the pedestal portion 20. The base 2 is formed of a metal such as a cast material of an aluminum alloy, for example. The pedestal portion 20 is fixed to the engine block 106 via a bolt or a pin. A surface of the engine block 106 on which the pedestal portion 20 is fixed is a substantially vertical surface. An oscillation shaft 8, extending in a front-and-rear direction, is rotatably passed through an inside of the inner cylindrical portion 22 via a bearing 7. The axis R is a center axis of the oscillation shaft 8. The axis R passes through a center of an inner circumferential surface of the outer cylindrical portion 21.

A spring accommodating chamber 9 is formed between the inner cylindrical portion 22 and a projecting portion 31, which will be described later, of the arm 3, and the outer cylindrical portion 21. The coil spring 5 is provided in the spring accommodating chamber 9. The coil spring 5 is spirally wound in an X direction from a rear end portion to a front end portion. The rear end portion of the coil spring 5 is held on the base 2.

The arm 3 includes: a circular disc portion 30 disposed at the front of the outer cylindrical portion 21 of the base 2; the projecting portion 31 extending to the rear from a central portion of the circular disc portion 30; and a pulley support portion 32 formed so as to protrude from a portion of an outer edge of the circular disc portion 30. As with the base 2 described above, the arm 3 is also formed of a metal such as a cast material of an aluminum alloy, for example A hole, extending in the front-and-rear direction, is formed in the central portion of the circular disc portion 30 and the projecting portion 31, and the oscillation shaft 8 is inserted in this hole so as not to rotate relatively. Thus, the arm 3 is rotatably supported on the base 2 via the oscillation shaft 8.

The tensioner pulley 4 is mounted rotatably on the pulley support portion 32. The belt 105 is to be wound around the tensioner pulley 4. The tensioner pulley 4 (and the arm 3) oscillates about the axis R as an increase and decrease of tension of the belt 105. In FIG. 2, an internal construction of the tensioner pulley 4 is omitted from illustration.

An annular gap 30a is formed between the vicinity of an outer edge of a rear surface of the circular disc portion 30 and a front end portion of the outer cylindrical portion 21 of the base 2. The annular gap 30a is formed as a result of the front end portion of the outer cylindrical portion 21 of the base 2 being accommodated in an annular groove formed in the vicinity of the outer edge of the rear surface of the circular disc portion 30. A part of the annular gap 30a extends along a direction orthogonal to the axis R. A portion on the rear surface of the circular disc portion 30 that is situated radially outward of the projecting portion 31 and radially inward of the annular gap 30a is formed into a flat shape that is perpendicular to the axis R.

The projecting portion 31 is formed into a substantially cylindrical shape. As illustrated in FIG. 3, a fan-shaped cut-out is formed in a front-side portion of the projecting portion 31, and both sides of the cut-out in the circumferential direction are constituted by a locking surface 31a and a contact surface 31b. FIG. 3 is a drawing combining FIG. 1 and a cross-sectional view taken along a line B-B in FIG. 2. When viewed in the direction of the axis R, the locking surface 31a intersects a straight line that passes through an arbitrary point on the locking surface 31a and the axis R. Namely, the locking surface 31a is inclined with respect to a radial direction. To describe this in greater detail, the locking surface 31a is inclined with respect to the radial direction in such a way as to be directed the X direction toward radially outward. In addition, the contact surface 31b is inclined with respect to the radial direction in such a way as to be directed an opposite direction to the X direction toward radially outward.

The friction member 6 is sandwiched in the radial direction between an inner circumferential surface of the outer cylindrical portion 21 of the base 2 and the projecting portion 31 of the arm 3. The friction member 6 has a length in the front-and-rear direction of almost the same as lengths in the front-and-rear direction of the locking surface 31a and the contact surface 31b. The length in the front-and-rear direction of the friction member 6 is preferably 1.2 to 3 times as large as a wire diameter of the coil spring 5. A front surface of the friction member 6 is flat and the whole or a part thereof is brought into contact with the rear surface of the circular disc portion 30 of the arm 3.

The friction member 6 is formed of, for example, a material having high lubricity in which a fiber, filler, solid lubricant, and the like are mixed into a synthetic resin. As the synthetic resin constituting the friction member 6, use can be made of, for example, a thermoplastic resin such as a polyamide resin, a polyacetal resin, a polytetrafluoroethylene resin, a polyphenylene sulfide resin, and an ultra-high-molecular-weight polyethylene, or a thermosetting resin such as a phenol resin. The friction member 6 may include a material other than those described above as long as a front surface and an arc-shaped surface 60, which will be described later, are formed of any of the materials described above.

The friction member 6 has a substantially fan shape in a cross-section orthogonal to the axis R; and has an arc-shaped surface 60, a locking surface 61 that is opposite to the arc-shaped surface 60, and two lateral surfaces 62, 63 that are opposite to each other in a circumferential direction. The locking surface 61 is brought into contact with the locking surface 31a of the projecting portion 31 of the arm 3. Of the two lateral surfaces 62, 63, a radially inward end portion of the lateral surface 63 that lies opposite to the X direction is brought into contact with the contact surface 31b of the projecting portion 31 of the arm 3. The friction member 6 is locked on the arm 3 by the locking surface 61 and the lateral surface 63. When viewed in the direction of the axis R, the center of an arc of the arc-shaped surface 60 coincides with the axis R, and the arc-shaped surface 60 is formed with almost the same radius of curvature as that of the inner circumferential surface of the outer cylindrical portion 21. The arc-shaped surface 60 is slidable along the inner circumferential surface of the outer cylindrical portion 21. When tension of the belt 105 fluctuates, causing the arm 3 to oscillate about the axis R, the friction member 6 oscillates by the same angle about the axis R with respect to the inner circumferential surface of the outer cylindrical portion 21. The arm 3 rotates in an opposite direction to the X direction indicated by an arrow in FIG. 3 when the tension of the belt 105 increases. The arm 3 rotates in the X-direction indicated by the arrow in FIG. 3 when the tension of the belt 105 decreases. In this description, the combined angle of an oscillating angle at the time when the tension of the belt 105 increases and an oscillating angle at the time when the tension of the belt 105 decreases is defined as an oscillation width of the arm 3. The angle at which the friction member 6 slides about the axis R (hereinafter, referred to as an oscillation width) is equal to the oscillation width of the arm 3. The oscillation width of the arm 3 is generally 10° or smaller. In an auto tensioner of an auxiliary-driving belt system for a general automobile engine, too, an oscillation width of an arm is generally 10° or smaller. The friction member 6 generates a frictional action on the sliding surfaces of the arc-shaped surface 60 and the inner circumferential surface of the outer cylindrical portion 21, to thereby damp the oscillation of the arm 3.

The friction member 6 is provided so that the arc-shaped surface 60 remains at a height equal to or higher than a horizontal plane HP that passes through the axis R when the friction member 6 oscillates with respect to the inner circumferential surface of the outer cylindrical portion 21 as the arm 3 oscillates. The center angle θ of the arc-shaped surface 60 is preferably smaller than 170°, when viewed in the direction of the axis R. The center angle θ of the arc-shaped surface 60 is preferably smaller than 150°, when viewed in the direction of the axis R. A lower limit value for the center angle θ of the arc-shaped surface 60 when viewed in the direction of the axis R can be considered to suppress an early wear of the arc-shaped surface 60 (sliding surface) of the friction member 6, even though no foreign matter is interposed between the arc-shaped surface 60 of the friction member 6 and the inner circumferential surface of the outer cylindrical portion 21. A preferable value of the lower limit value for the center angle θ of the arc-shaped surface 60 when viewed in the direction of the axis R differs particularly depending upon a material of a portion of the friction member 6 that constitutes the arc-shaped surface 60. In the case where a material of the portion of the friction member 60 that constitutes the arc-shaped surface 60 is, for example, a polyamide resin (PA6T), the lower limit value for the center angle θ of the arc-shaped surface 60 when viewed in the direction of the axis R may be set at of the order of 30°. In FIG. 3, the center angle θ of the arc-shaped surface 60 is 43°.

In the case of the belt 105 being a V-ribbed belt, the belt 105 further slightly sinks toward the bottom direction of circumferential grooves of the respective pulleys 101, 102 and 104, with which crests of ribs are brought into engagement, to thereby be deformed continuously from a moment when a predetermined initial tension (e.g., 330 N) is applied.

The tension of the belt is slightly decreased in this process. Thereafter, the tension of the belt 105 becomes stable at a substantially constant level in a stage where the engagement of the belt 105 and the pulleys is settled (e.g., at a point in time when a running-in driving is completed). Similarly, in the case of the belt 105 being a power-transmission belt other than a flat belt, such as a V belt and a toothed belt, too, the tension of the belt is started to decrease after a predetermined initial tension is applied thereon, and the tension becomes stable thereafter.

FIG. 4 illustrates a state in which the predetermined initial tension is applied on the belt 105. FIG. 3 illustrates a state in which a running-in driving after the initial tension is applied is completed and the tension of the belt becomes stable. When the tension of the belt is decreased after the initial tension is applied, the arm 3 and the friction member 6 rotate in the X direction indicated by the arrow.

The present embodiment (FIG. 3 and FIG. 4) represents an example where the belt 105 has a belt length of a standard dimension. The belt length varies within a permissible value during the production. For example, in the case of a V-ribbed belt whose belt length is 1,555 mm, a permissible value is the standard dimension±8 mm. The predetermined initial tension is set on the premise that the belt length is the standard dimension. Therefore, in the case where the belt length is longer than the standard dimension, compared with the case where the belt length is the standard dimension, the initial tension becomes lower, and a stabilized tension resulting after a running-in driving is completed also becomes lower. On the contrary, in the case where the belt length is shorter than the standard dimension, compared with the case where the belt length is the standard dimension, the initial tension becomes higher, and a stabilized tension resulting after a running-in driving is completed also becomes higher.

In the case where the belt length is longer than the standard dimension, positions that the arm 3 and the friction member 6 take at a point in time when the belt tension becomes stable deviate in the X direction indicated by the arrow relative to positions that the arm 3 and the friction member 6 take at a point in time when the belt tension becomes stable in the case where the belt length is the standard dimension. Positions that the arm 3 and the friction member 6 take at a point in time when the belt tension becomes stable in the case where the belt length is a maximum within the permissible value deviate within 5° in the X direction indicated by the arrow relative to positions that the arm 3 and the friction member 6 take at a point in time when the initial tension is applied in the case where the belt length is the standard dimension.

In the case where the belt length is shorter than the standard dimension, positions that the arm 3 and the friction member 6 take at a point in time when the belt tension becomes stable deviate in an opposite direction to the X direction indicated by the arrow relative to the positions that the arm 3 and the friction member 6 take at a point in time when the belt tension becomes stable in the case where the belt length is the standard dimension. Positions that the arm 3 and the friction member 6 take at a point in time when the belt tension becomes stable in the case where the belt length is a maximum within the permissible value may deviate in the opposite direction to the X direction indicated by the arrow relative to the positions that the arm 3 and the friction member 6 take at a point in time when the initial tension is applied in the case where the belt length is the standard dimension. This angle resulting then is smaller than a maximum of 5°.

Here, as illustrated in FIG. 4, when viewed in the direction of the axis R, an area situated at a central portion of the arc-shaped surface 60 and defined by a center angle of 10° is referred to as a central area 60c. In consideration of the decrease in belt tension after the initial tension is applied and the variation in belt length, when viewed in the direction of the axis R, the friction member 6 is preferably provided so that an uppermost position 21t on the inner circumferential surface of the outer cylindrical portion 21 is brought into contact with the central area 60c of the arc-shaped surface 60 at a point in time when the predetermined initial tension is applied on the belt 105. In FIG. 4, the friction member 6 is provided so that the uppermost position 21t on the inner circumferential surface of the outer cylindrical portion 21 is brought into contact with a middle position of the arc-shaped surface 60 when viewed in the direction of the axis R. However, the position of the friction member 6 is not limited to that position.

To realize the configuration in which the uppermost position 21t of the outer cylindrical portion 21 is brought into contact with the central area 60c of the arc-shaped surface 60 of the friction member 6 in the state where the predetermined tension applied on the belt 105, the following two operations can be taken as a specific operation to be performed in determining a layout for the auxiliary-driving belt system 100. In the case where a position where the base 2 is fixed to the engine block 106 is determined, the friction member 6 is disposed so as to realize the configuration described above by adjusting the positions of the locking surface 31a and contact surface 31b of the projecting portion 31 and the position of the front end portion of the coil spring 5. In the case where the fixing position of the base 2 is not determined, the base 2 is fixed to the engine block 106 so that the friction member 6 realizes the configuration described above by moving the position of the axis R circumferentially about an axis center of a rotational shaft of the Tensioner pulley 4.

The locking surface 61 of the friction member 6 is situated toward the X direction with respect to the arc-shaped surface 60 in the circumferential direction. Additionally, the locking surface 61 is inclined with respect to the radial direction so as to be directed the X direction toward radially outward. The two lateral surfaces 62, 63 are inclined with respect to the radial direction so as to be directed the opposite direction to the X direction toward radially outward. The lateral surface 62, which is situated toward the X direction of the lateral surfaces 62, 63, is substantially orthogonal to the locking surface 61.

In a state where no external force is applied on the friction member 6, a length from the locking surface 61 to the arc-shaped surface 60 in a direction orthogonal to the locking surface 61 is slightly greater than the distance from the locking surface 31a of the arm 3 to the inner circumferential surface of the outer cylindrical portion 21 of the base 2 in a direction orthogonal to the locking surface 31a. Consequently, the friction member 6 is disposed between the projecting portion 31 of the arm 3 and the outer cylindrical portion 21 of the base 2 while being compressed slightly in a direction substantially orthogonal to the locking surface 61.

A holding groove 64 is formed on a rear surface of the friction member 6 to hold the front end portion of the coil spring 5. Similar to the rear end portion, the front end portion of the coil spring 5 is bent near its end, and a portion on further end side than the bent portion extends straight. This straight portion is held in the holding groove 64. The holding groove 64 is positioned further radially outward than the locking surface 61 and is positioned further toward the opposite direction to the X direction than the locking surface 61 in relation to the circumferential direction.

The coil spring 5 is disposed in such a state of being compressed in the direction of the axis R. This causes the coil spring 5 to press the friction member 6 against a rear surface of the circular disc portion 30 of the arm 3 by means of an elastic restoring force acting in the direction of the axis R.

Additionally, the coil spring 5 is disposed in such a state of being twisted in a radially expanding direction. This causes the coil spring 5 to rotationally bias the arm 3 in the X direction via the friction member 6, that is, in a direction in which the tension of the belt 105 is increased while pressing the Tensioner pulley 4 against the belt 105, by means of an elastic restoring force acting in the circumferential direction.

Next, the behavior of the auto tensioner 1 will be described.

When the tension of the belt 105 is increased, the arm 3 rotates in a direction indicated by an arrow A (opposite direction to the X direction) illustrated in (a) of FIG. 5 against the circumferential biasing force of the coil spring 5. The friction member 6 receives a force Fa from the locking surface 31a of the arm 3 to rotate in the direction indicated by the arrow A, whereby the arc-shaped surface 60 of the friction member 6 slides on the inner circumferential surface of the outer cylindrical portion 21 of the base 2.

The arc-shaped surface 60 of the friction member 6 is situated further toward the opposite direction to the X direction (direction indicated by the arrow A) than the locking surface 61 of the friction member 6 in the circumferential direction. Furthermore, in this embodiment, a tangential direction of a circumference centered about the axis R at an arbitrary point on the locking surface 61 (hereinafter, referred to simply as a "tangential direction") intersects the arc-shaped surface 60. The force Fa that the locking surface 61 of the friction member 6 receives from the arm 3 is a force acting in the tangential direction of the locking surface 61, and therefore, the arc-shaped surface 60 exists on a straight line extending from the locking surface 61 in the direction of the force Fa. Due to this, the force Fa that the locking surface 61 of the friction member 6 receives from the arm 3 can be used as a force by which the arc-shaped surface 60 of the friction member 6 is pressed against the inner circumferential surface of the outer cylindrical portion 21 of the base 2.

The friction member 6 receives an elastic restoring force Fs resulting from the torsional deformation of the coil spring 5 in the radially expanding direction (hereinafter, referred to as a "torsional restoring force"). The torsional restoring force Fs is a resultant force of a force component Fs1 acting in the X direction and a force component Fs2 acting in a radially contracting direction.

Consequently, a resultant force Fr of the force Fa received from the arm 3 and the torsional restoring force Fs of the coil spring 5 acts on the friction member 6. Since the force Fa is greater than the torsional restoring force Fs, the resultant force Fr becomes a force directed radially outward, whereby the arc-shaped surface 60 of the friction member 6 is pressed against the inner circumferential surface of the outer cylindrical portion 21 of the base 2 by means of the resultant force Fr. This can generate a great frictional force between the arc-shaped surface 60 of the friction member 6 and the inner circumferential surface of the outer cylindrical portion 21 of the base 2, whereby a damping force that is great enough to damp the oscillation of the arm 3 can be generated.

On the contrary, when the tension of the belt 105 is decreased, the arm 3 rotates in a direction indicated by an arrow B (same direction as the X direction) illustrated in (b) of FIG. 5, by means of the torsional restoring force of the coil spring 5, whereby the tensioner pulley 4 oscillates so as to restore the belt tension. The friction member 6 receives the torsional restoring force Fs from the coil spring 5 to rotate in the direction indicated by the arrow B, whereby the arc-shaped surface 60 of the friction member 6 slides on the inner circumferential surface of the outer cylindrical portion 21 of the base 2. The friction member 6 is biased radially inward by means of the force component Fs2 acting in the radially contracting direction of the torsional restoring force Fs, and therefore, a frictional force generated between the arc-shaped surface 60 of the friction member 6 and the inner circumferential surface of the outer cylindrical portion 21 of the base 2 is small.

In the event that an end portion of the arc-shaped surface 60 in the X direction extends as far as a circumferential range of the locking surface 61, the arc-shaped surface 60 of the friction member 6 is pressed against the inner circumferential surface of the outer cylindrical portion 21 by means of the force component Fs1 in the circumferential direction of the torsional restoring force Fs of the coil spring 5. In this embodiment, however, since the arc-shaped surface 60 of the friction member 6 is situated further toward the opposite direction to the X direction than the locking surface 61 of the friction member 6 in the circumferential direction, the arc-shaped surface 60 of the friction member 6 is not pressed against the inner circumferential surface of the outer cylindrical portion 21 by means of the force component Fs1 in the circumferential direction of the torsional restoring force Fs of the coil spring 5 and thus, an increase in frictional force between the arc-shaped surface 60 of the friction member 6 and the inner circumferential surface of the outer cylindrical portion 21 can be prevented.

Consequently, a frictional force that is smaller than that generated when the arm 3 rotates in the direction indicated by the arrow A is generated between the arc-shaped surface 60 of the friction member 6 and the inner circumferential surface of the outer cylindrical portion 21 of the base 2, whereby the arm 3 can receive the torsional restoring force of the coil spring 5 sufficiently, thereby allowing the oscillation of the arm 3 to follow the decrease in the belt tension sufficiently. In this way, the magnitude of the frictional force to be generated differs between when the belt tension is increased and when the belt tension is decreased, and hence, the auto tensioner 1 has an asymmetric damping property (an asymmetric damping property).

Thus, as has been described heretofore, the friction member 6, which is a damping generating member locked on the arm 3, is provided so that the arc-shaped surface 60 (sliding surface) of the friction member 6 remains at the height equal to or higher than the horizontal plane HP that passes through the center axis (axis R) of the inner circumferential surface of the outer cylindrical portion 21 of the base 2 when sliding on the mating surface (inner circumferential surface of the outer cylindrical portion 21 of the base 2) as the arm 3 oscillates.

Normally, in an auto tensioner provided in an auxiliary-driving belt system, although an arm oscillates violently, an oscillation width itself of the arm is relatively small (a maximum of about 10°). Therefore, it is feasible to provide the friction member 6 so that the arc-shaped surface 60 (sliding surface) thereof remains at the height equal to or higher than the horizontal plane HP that passes through the center axis (axis R) of the inner circumferential surface of the outer cylindrical portion 21 of the base 2 or higher when the arm 3 oscillates.

In general, a base of the auto tensioner is fixed to a substantially vertical surface of an engine block or the like. Therefore, in foreign matters M contained in a water medium such as muddy water that enters from the annular gap 30a formed between the outer cylindrical portion 21 of the base 2 and the arm 3 under an environment where the auto tensioner 1 is splashed with such a water medium as muddy water, although some pass through a lower portion of the annular gap 30a to an exterior, the remaining foreign matters M are accumulated on the inner circumferential surface of the outer cylindrical portion 21 of the base 2 (refer to FIG. 3). On the inner circumferential surface of the outer cylindrical portion 21 of the base 2, the foreign matters M are not accumulated on a portion situated upper than the horizontal plane HP that passes through the axis R but are accumulated on a portion situated lower than the horizontal plane HP that passes through the axis R.

Consequently, the arc-shaped surface 60 (sliding surface) of the friction member 6 is not brought into contact with the portion where the foreign matters M are accumulated in the inner circumferential surface of the outer cylindrical portion 21 of the base 2. Additionally, even though the foreign matters M enter between the arc-shaped surface 60 (sliding surface) of the friction member 6 and the mating surface (inner circumferential surface of the outer cylindrical portion 21 of the base 2), the foreign matters M tend to be swept downward. Thus, the foreign matters M can be prevented from being interposed between the arc-shaped surface 60 (sliding surface) of the friction member 6 and the inner circumferential surface of the outer cylindrical portion 21 of the base 2. As a result, even though no seal member is provided, an early wear of the arc-shaped surface 60 (sliding surface) of the friction member 6 can be suppressed, whereby the durability of the auto tensioner 1 can be ensured.

In the case where the belt 105 is a type having a projection configured to be brought into engagement with a groove of a pulley, such as a V-ribbed belt or a toothed belt, the belt tension is decreased from a moment where an initial tension is applied and is thereafter stabilized. Additionally, the initial tension is set on the promise that the belt 105 has the standard dimension. However, the belt length varies within a permissible value when the belt 105 is produced. The initial tension becomes higher as the belt length is shorter than the standard dimension, and the tension resulting after stabilization also remains higher.

Even though the belt tension is decreased after the initial tension is applied and though the belt length varies as described above, the position of the friction member 6 in the state where the belt tension is stabilized remains within a range of about ±5° about the axis R from the position of the friction member 6 at the point in time when the predetermined initial tension is applied on the belt 105 of the standard dimension. Furthermore, an oscillation width of the arm 3 is generally 10° or smaller. The center angle of the arc-shaped surface 60 is smaller than 150° when viewed in the direction of the axis R and the friction member 6 is provided so that the uppermost position 21t of the inner circumferential surface of the outer cylindrical portion 21 of the base 2 is brought into contact with the area 60c that constitutes the central portion of the arc-shaped surface 60 and whose center angle is 10° when viewed in the direction of the axis R, at a point in time when the predetermined initial tension is applied on the belt 105. This can reliably realize the configuration in which the arc-shaped surface 60 of the friction member 6 remains at the height equal to or higher than the horizontal plane HP that passes through the axis R when the arm 3 oscillates. Additionally, even though the belt tension is decreased after the initial tension is applied and though the belt length varies, the middle position of the arc-shaped surface 60 of the friction member 6 when viewed in the direction of the axis R can be positioned near the uppermost portion of the inner circumferential surface of the outer cylindrical portion 21 of the base 2 when the arm 3 oscillates. In a comparison where the length of an arc of the arc-shaped surface 60 remains the same, a lowermost end of the arc-shaped surface 60 becomes higher as the middle position of the arc-shaped surface 60 becomes nearer to the uppermost portion 21t of the inner circumferential surface of the outer cylindrical portion 21. As the lowermost end of the arc-shaped surface 60 becomes higher, it becomes more difficult for the foreign matters M to enter the gap between the arc-shaped surface 60 and the inner circumferential surface of the outer cylindrical portion 21 of the base 2, and even though they enter, they are easily swept out downward. Consequently, the interposition of the foreign matters M between the arc-shaped surface 60 (sliding surface) of the friction member 6 and the inner circumferential surface of the outer cylindrical portion 21 of the base 2 can be prevented more reliably.

While the preferred embodiment of the present invention has been described, the present invention is not limited to the embodiment but can be modified variously within the disclosure of the scope of claims.

The arc-shaped surface of the friction member of the present invention is not limited to the single surface that is continuous in the direction of the arc and brought into sliding contact with the inner circumferential surface of the cylindrical portion of the base. The arc-shaped surface of the friction member may be formed by a plurality of divided arc-shaped surfaces that are brought into sliding contact with the inner circumferential surface of the cylindrical portion of the base discontinuously in the circumferential direction. Additionally, the friction member may be a single body or a connected body that is divided into a plurality of portions in the direction of the arc.

In the auto tensioner to be provided in an auxiliary-driving belt system of the present invention, the friction member may not be pressed against the arm in the axial direction.

The auto tensioner to be provided in an auxiliary-driving belt system of the present invention may be an auto tensioner having a symmetric damping property.

An object to which the base portion of the auto tensioner to be provided in an auxiliary-driving belt system of the present invention is fixed may not be limited to the engine block.

EXAMPLES

[Verification Test of Oscillation Width of Arm]

A test was carried out to verify the maximum value of the oscillation width of the arm of the auto tensioner provided in an auxiliary-driving belt system of the present invention. The auto tensioner of Example 1 used for this test has the same configuration as that of the auto tensioner 1 of the embodiment described above. The material for the friction member (6) is a polyamide resin (PA6T). The center angle (θ) of the arc-shaped surface (60) is 43° when viewed in the direction of an axis center (R) of the oscillation shaft (8). The length of the friction member 6 in the front-and-rear direction is about 1.4 times as large as a wire diameter of the coil spring 5. The bearing (7) is a cylindrical metallic bearing (a so-called metal bearing). An inner circumferential surface of the bearing (7) that is brought into contact with the oscillation shaft (8) is formed of a resin compound (low-friction material) containing a lubricant of polytetrafluoroethylene. The belt (105) is a V-ribbed belt (produced by Mitsuboshi Belting Ltd.), and used was one which belt name is 6PK1555 (K-shaped ribs, the number of ribs in a belt width direction is 6, a belt length (POC) is 1,555 mm, and a belt width is 21.4 mm). The cord embedded in the belt (105) is a twisted rope employing a polyester cord.

The auto tensioner of Example 1 was assembled to an auxiliary-driving belt system having the same configuration as that of the auxiliary-driving belt system 100 illustrated in FIG. 1, and the belt (105) was wound therearound. An initial tension of the belt (105) was 330 N. The position of the friction member (6) when the initial tension was applied was set to the position illustrated in FIG. 4. Namely, the middle position of the arc-shaped surface (60) of the friction member (6) was adjusted to come into contact with the uppermost position of the inner circumferential surface of the outer cylindrical portion (21) of the base (2), when viewed in the direction of the center axis (R) of the oscillation shaft (8). Additionally, the position of the friction member (6) after a running-in driving (for about 5 minutes at a revolution speed of the crank pulley of from 500 to 800 rpm) after the initial tension was applied, was the position illustrated in FIG. 3. Specifically, the middle position of the arc-shaped surface (60) of the friction member (6) was located in a position deviating 2° about the center axis (R) from the uppermost position of the inner circumferential surface of the outer cylindrical portion (21) of the base (2) when viewed in the direction of the center axis (R) of the oscillation shaft (8).

The oscillation width of the arm (3) becomes maximum at the time when an engine is started. Then, an engine-starting test was carried out in which start and stop of the engine was alternately and repeatedly performed, and the oscillation width of the arm (3) during the engine-starting test was measured. The start and stop of the engine was alternately and repeatedly performed under an atmosphere temperature of 95° C. after the running-in driving described above had been completed, and the test was ended at a point in time when the number of times of starting the engine reached 50 times. An operating time of the engine (a time from start to stop) for one operation was set at 10 seconds. The atmosphere temperature is a temperature based on an assumption of a temperature inside a constant temperature room surrounding the auxiliary-driving belt system in an actual vehicle. The revolution speed of the crankshaft fluctuated in a range of from 0 to 1,800 rpm every time the engine was started. The oscillation width of the arm (3) was obtained by measuring a displacement amount in which an axis center of the rotational shaft of the tensioner pulley 4 rotated about an axis center (axis R) of the oscillation shaft (8) by the use of a laser displacement meter in chronological order. The oscillation width of the arm (3) during the 50 operations in the engine-starting test was about 10° (a minimum of 8.5°, a maximum of 10°, and an average of 9.5° over 50 operations).

[Muddy Water-Dripping Durability Test]

To study the advantageous effect of the present invention, a test was carried out in which the arm was forced to oscillate under an environment where the auto tensioner was splashed with muddy water, to evaluate the wear of the friction member. This test was carried out by the use of a testing belt system 200 illustrated in FIG. 6 and a muddy water-dripping device (not illustrated). The testing belt system 200 was fixed to a frame 220 extending in a vertical direction, and the frame 220 was fixed to a platform 221 fixed to a floor or the like and extending substantially in a horizontal direction. The testing belt system 200 included two belt systems (first belt system 201 and second belt system 202) that were designed to be driven simultaneously by one driving pulley 203. The two belt systems 201, 202 shared one driving motor having a driving shaft 204 and one driving pulley 203 connected to the driving shaft. The first belt system 201 included an auto tensioner 205 of Example 2, a driven pulley 206 and a belt 207. The second belt system 202 included an auto tensioner 208 of Comparison Example 1, a driven pulley 209 and a belt 210. The positions of three pulleys of the first belt system 201 and the positions of three pulleys of the second belt system 202 were in point symmetry with respect to an axis center of the driving shaft 204.

The driving shaft 204 was disposed in a direction orthogonal to the frame 220. No auxiliary was connected to the driven pulleys 206, 209. Two circumferential grooves, around which the belts 207, 210 were designed to be wound in parallel, were provided on an outer circumferential surface of the driving pulley 203 with separating to each other in the axis direction. The driving pulley 203 was made into a so-called eccentric pulley in which the axis center of the driving shaft 204 was formed in a position that was spaced by a predetermined eccentric amount d away from a center of the driving pulley 203 when viewed in the direction of the axis center of the driving shaft 204 so that arms 3 of the auto tensioners 205, 208 can be forced to oscillate. The eccentric amount d was set at 4 mm so that the oscillation widths of the arms 3 (oscillation widths of friction members) could become 10°. The belts 207, 210 were V-ribbed belts (produced by Mitsuboshi Belting Ltd.), used was one which belt name is 6PK730 (K-shaped ribs, the number of ribs in a belt width direction is 6, a belt length (POC) is 730 mm, and a belt width is 21.4 mm). The cord embedded in the belts 207, 210 is a twisted rope employing a polyester cord.

The auto tensioner 205 of Example 2 and the auto tensioner 208 of Comparison Example 1 had the same construction as that of the auto tensioner of Example 1. In the following description, the same reference numerals will be given to the corresponding constituent elements of the auto tensioners 205,208 as those of the above-described embodiment. The auto tensioners 205, 208 of Example 2 and Comparison Example 1 were mounted on the frame 220 so that arc-shaped surfaces 60 of the friction members 6 were positioned differently from each other relative to the horizontal plane HP that passes through the axis R. In the following description, a position that is situated by an angle of X° away upwardly from the horizontal plane HP about the axis R is referred to as a position of the horizontal plane HP+X°, and a position that is situated by the angle of X° away downwardly from the horizontal plane HP about the axis R is referred to as a position of the horizontal plane HP−X°.

The auto tensioner 205 of Example 2 was configured so that the arc-shaped surface 60 could remain at a height equal to or higher than the horizontal plane HP that passes through the axis R when sliding on the inner circumferential surface of the outer cylindrical portion 21 of the base 2 as the arm 3 oscillates. Specifically, as illustrated in (a) of FIG. 7 and (b) of FIG. 7, the lowermost end of the arc-shaped surface 60 was made to remain between the horizontal plane HP and the position of the horizontal plane HP+10°. Namely, the auto tensioner 205 was mounted on the frame 220 so that the lowermost end of the arc-shaped surface 60 of the friction member 6 could be positioned on the horizontal plane HP when the tension of the belt 207 was decreased, causing the arc-shaped surface 60 of the friction member 6 to slide to a maximum extent in the X direction as illustrated in (b) of FIG. 7 and that the lowermost end of the arc-shaped surface 60 of the friction member 6 could be located on the position of the horizontal plane HP+10° when the tension of the belt 207 was increased, causing the arc-shaped surface 60 of the friction member 60 to slide to a maximum extent in the opposite direction to the X direction as illustrated in (a) of FIG. 7.

The auto tensioner 208 of Comparison Example 1 was configured so that the arc-shaped surface 60 could remain, when viewed in the direction of the axis R, at the height equal to or lower than the horizontal plane HP that passes through the axis R when sliding on the inner circumferential surface of the outer cylindrical portion 21 of the base 2 as the arm 3 oscillates. Specifically, as illustrated in (c) of FIG. 7 and (d) of FIG. 7, the uppermost end of the arc-shaped surface 60 was made to remain between the horizontal plane HP and the position of the horizontal plane HP−10°. Namely, the auto tensioner 208 was mounted on the frame 220 so that the uppermost end of the arc-shaped surface 60 of the friction member 6 could be positioned on the horizontal plane HP when the tension of the belt 207 was decreased, causing the arc-shaped surface 60 of the friction member 6 to slide to a maximum extent in the X direction as illustrated in (d) of FIG. 7 and that the uppermost end of the arc-shaped surface 60 of the friction member 6 could be located on the position of the horizontal plane HP−10° when the tension of the belt 207 was increased, causing the arc-shaped surface 60 of the friction member 6 to slide to a maximum extent in the opposite direction to the X direction as illustrated in (c) of FIG. 7.

The muddy water-dripping device included two muddy water-dripping nozzles 211, 212. The two muddy water-dripping nozzles 211, 212 were disposed respectively above annular gaps 30a that were formed between the outer cylindrical portions 21 of the bases 2 and the corresponding arms 3 of the auto tensioners 205, 208 of Example 2 and Comparison Example 1 so that a substantially constant amount of muddy water could be allowed to enter interiors (inside the outer cylindrical portions 21) of the auto tensioners 205, 208 per unit time. The manner of dripping muddy water adopted was a gravitational dripping manner like a drip infusion apparatus. A suspension in which a testing powder (JIS Class 8: KANTO loam baked product) prescribed under JIS Z8901: 2006 was dispersed in water in a concentration of 5 wt % was used as muddy water.

The test was carried out at an atmosphere temperature of 95° C. The initial tension applied on the belts 207, 210 was 330 N. A running-in driving was carried out (for on the order of 10 seconds) after the initial tension was applied, and the driving pulley 203 was stopped. Thereafter, 500 cc of muddy water was dripped over 5 minutes. Then, after the muddy water was stopped dripping, the driving pulley 203 was driven clockwise at a revolution speed of 1,200 rpm for 25 minutes. One test cycle was made up of a dripping of muddy water (for 5 minutes) and a driving of the driving pulley 203 (for 25 minutes), and seven test cycles in total were carried out repeatedly. Thereafter, the driving pulley 203 was kept being driven continuously at the rotation speed of 1,200 rpm over 12 hours. It is assumed that during the operation, a water medium contained in the muddy water evaporates gradually, causing only foreign matters (solid matters) to accumulate within the outer cylindrical portions 21 of the bases 2.

The auto tensioners 205, 208 of Example 2 and Comparison Example 1 were removed from the frame 220 immediately after the driving pulley 203 was stopped, and they were evaluated in three evaluation items, which will be described later. The evaluations were performed without disassembling the auto tensioners 205, 208. About 0.5 hour was spent for the evaluations. Namely, the total time spent from the initial dripping of the muddy water to the evaluations was 16 hours. As long as the evaluations was Rank A (Pass), the operation described above (operation of 16 hours in total) was to be repeated until a target testing time of 300 hours (corresponding to a service life of an actual vehicle) was reached. The friction member 6 is estimated to have slid backward and forward about 20 million times by the time when the testing time of 300 hours is reached. Additionally, the auto tensioners 205, 208 of Example 2 and Comparison Example 1 were measured in the three evaluation items before being fixed to the frame 220 to thereby obtain initial values before the test.

<Evaluation Method: Arm Tilting Amount>

The first evaluation item was tilting amounts of the arms. The degree of wear of the arc-shaped surface 60 of the friction member 6 cannot be evaluated without disassembling the auto tensioner. Then, a tilting amount of the arm 3 toward the arc-shaped surface 60 was measured as an alternative property for the degree of wear of the arc-shaped surface 60 of the friction member 6. Specifically, a tilting amount [°] of the arm 3 was calculated by measuring a dimension A and a dimension B below. As illustrated in FIG. 8, a center axis of the oscillation shaft 8 before the arm 3 tilts was referred to as an axis R0, and a center axis of the oscillation shaft 8 after the arm tilts was referred to as an axis R1. The dimension A was referred to as a height dimension from the outer edge of the front surface of the arm 3 to the outer edge of the rear surface of the pedestal portion 20 of the base 2 along the direction of the axis R0, in a circumferential position that divides the arc-shaped surface 60 of the friction member 6 equally into two portions in the arc direction when viewed in the direction of the axis R0 (or axis R1). The dimension B was referred to as a height dimension from the outer edge of the front surface of the arm 3 to the outer edge of the rear surface of the pedestal portion 20 of the base 2 along the direction of the axis R0 in a circumferential position that was situated 180° away from the position where the dimension A was measured when viewed in the direction of the axis R0 (or axis R1). In the present invention, the "center axis of the cylindrical portion of the base" is not limited to the axis R0 but may be the axis R1.

The cases where the tilting amount of the arm was 1° or smaller and the increase in the tilting amount of the arm was moderate were evaluated as Rank A (Pass). The cases where the tilting amount of the arm exceeded 1° were evaluated as Rank C (Fail). The cases where the tilting amount of the arm was 1° or smaller but the increase in the tilting amount of the arm was remarkably were evaluated as Rank B (Caution).

<Evaluation Method: Damping Torque>

The second evaluation item was a damping torque. Torque was measured on the auto tensioners 205, 208 of Example 2 and Comparison Example 1 by using a torque meter to obtain a torque curve (diagram showing a relationship between arm rotating angle and damping torque). A width [N·m] of the damping torque at the angle at which the arm 3 is rotated when the coil spring 5 is assembled (hereinafter, referred to as an arm-rotating angle, which is, e.g., 60°) was read from the resulting torque curve. Here, the width [N·m] of the damping torque denotes a value resulting from deducting a damping torque [N·m] in a direction in which the belt is tensioned from a damping torque [N·m] in a direction in which the belt is loosen at an arbitrary arm rotating angle (e.g., 60°).

The cases where the width of the damping torque was 4 N·m or greater and the torque curve was not disturbed were evaluated as Rank A (Pass). The cases where the width was smaller than 4 N·m were evaluated as Rank C (Fail). The cases where the width was 4 N·m or greater but the torque curve was recognized as being disturbed were evaluated as Rank B (Caution).

<Evaluation Method: Spring Torque>

The third evaluation item was spring torque. Torsional torques [N·m] of the coil springs 5 at the arm rotating angle resulting when the coil springs 5 were assembled (torsional angles of the coil springs 5, e.g., 60°) were calculated on the auto tensioners 205, 208 of Example 2 and Comparison Example 1 through operations based on the torque curves obtained when evaluating the damping torques.

The cases where the torsional torque [N·m] was 20 N·m or greater and 28 N·m or smaller were evaluated as Rank A (Pass). The cases of smaller than 20 N·m or greater than 28 N·m were evaluated as Rank C (Fail).

<Evaluation Result: Arm Tilting Amount>

FIG. 9 is a graph showing relationships between arm tilting amount [°] and testing time in Example 2 and Comparison Example 1. In Example 2, the test was continued exceeding the target testing time of 300 hours until 390 hours was reached. The arm tilting amount continued to be stable generally within a range of from 0.4° to 0.5° relative to the initial value (a slightly greater than 0.3°) measured before the test. Thus, as a result of the evaluation, Example 2 was evaluated as Rank A (Pass) with a good margin.

The auto tensioner 205 was disassembled after the test of 390 hours was completed, to visually confirm the condition of wear of the arc-shaped surface 60 of the friction member 6, the condition of the inner circumferential surface of the outer cylindrical portion 21 of the base 2 that faces the arc-shaped surface 60, and the like. As a result, the worn depth (a maximum) of the arc-shaped surface 60 was only 0.15 mm, which is a level at which no problem is caused. No accumulation of foreign matters was recognized on a portion of the inner circumferential surface of the outer cylindrical portion 21 of the base 2 that faces the arc-shaped surface 60.

On the other hand, in Comparison Example 1, the arm tilting amount reached 0.6° only in 32 hours (the friction member 6 had slid backward and forward about 2 million times), and a remarkable increase was recognized from the initial value (slightly greater than 0.4°) measured before the test (Rank B). Therefore, the test was stopped at that point in time.

The auto tensioner 208 was disassembled after the test of 32 hours was completed, to visually confirm the condition of wear of the arc-shaped surface 60 of the friction member 6, the condition of the inner circumferential surface of the outer cylindrical portion 21 of the base 2 that faces the arc-shaped surface 60, and the like. As a result, the worn depth (a maximum) of the arc-shaped surface 60 reached 0.25 mm, and the wear was found remarkable as compared to that of Example 2 in consideration of the testing time, which was determined to be a problematic level. In addition, an accumulation of a substantial amount of foreign matters was recognized on a portion on the inner circumferential surface of the outer cylindrical portion 21 of the base 2 that faces the arc-shaped surface 60.

In the event that the test had continued without stopping the test, it was assumed that the tilting amount of the arm would have reached 1° only in 70 hours of the testing time. It was also assumed that the worn depth (a maximum) of the arc-shaped surface 60 of the friction member 6 would have reached as deep as 0.40 mm at that time. In this way, it has been found out that Example 2 exhibited a remarkable wear suppression effect for the arc-shaped surface 60 of the friction member 6, as compared with Comparison Example 1.

<Evaluation Result: Damping Torque>

In Example 2, the width of the damping torque stayed around a stable value (from about 5 to 7 N·m) during the test, relative to the initial value (10 N·m) measured before the test, and no disturbance was recognized in the torque curve measured during the test (Rank A).

On the other hand, in Comparison Example 1, similar to Example 2, no problem was found in the width of the damping torque. However, some disturbance was recognized in the torque curve measured during the test (Rank B). It is considered that this is because foreign matters were interposed between the arc-shaped surface 60 of the friction member 6 and the inner circumferential surface of the outer cylindrical portion 21 of the base 2.

<Evaluation Result: Spring Torque>

In both Example 2 and Comparison Example 1, the value of the spring torque stayed around a stable value (from about 22 to 23 N·m) during the test, relative to the initial value (25 N·m) measured before the test (Rank A).

This patent application is based on Japanese Patent Application No. 2016-126315 filed on Jun. 27, 2016 and Japanese Patent Application No. 2017-113115 filed on Jun. 8, 2017, the contents of which are incorporated herein by reference.

REFERENCE SIGNS LIST

1 Auto tensioner
2 Base
3 Arm
4 Tensioner pulley
5 Coil spring
6 Friction member
21 Outer cylindrical portion (Cylindrical portion)
60 Arc-shaped surface
100 Auxiliary-driving belt system
105 Belt
R Axis (Central axis)
HP Horizontal plane

The invention claimed is:

1. An auto tensioner to be provided in an auxiliary-driving belt system, comprising:
a base having a cylindrical portion;
an arm supported on the base so as to be rotatable about a center axis of an inner circumferential surface of the cylindrical portion;
a tensioner pulley provided on the arm so as to be rotatable and configured to be wound with a belt;
a friction member locked on the arm while being sandwiched between the inner circumferential surface of the cylindrical portion and the arm in a radial direction of the cylindrical portion, and having an arc-shaped surface configured to be slidable on the inner circumferential surface of the cylindrical portion; and
a coil spring configured to rotationally bias the arm in one direction with respect to the base,
wherein when the arm oscillates due to a fluctuation of tension of the belt wound around the tensioner pulley, the oscillation of the arm is damped by generating a frictional force between the arc-shaped surface and the inner circumferential surface of the cylindrical portion, and wherein the friction member is provided so that the arc-shaped surface remains at a height equal to or higher than a horizontal plane perpendicular to a vertical direction and containing the center axis when it slides on the inner circumferential surface of the cylindrical portion as the arm oscillates.

2. The auto tensioner to be provided in an auxiliary-driving belt system, according to claim 1, wherein the arc-shaped surface has a center angle of smaller than 150° when viewed in a direction of the center axis, and the friction member is provided so that an uppermost portion of the inner circumferential surface of the cylindrical portion is brought into contact with an area that constitutes a central portion of the arc-shaped surface, wherein a center angle of the central portion of the arc-shaped surface is 10° when viewed in the direction of the center axis, at a point in time when a predetermined initial tension is applied on the belt, and wherein the center angle of the central portion of the arc-shaped surface is a portion of the center angle of the arc-shaped surface.

3. The auto tensioner to be provided in an auxiliary-driving belt system according to claim 1, wherein the friction member is provided so that the arc-shaped surface remains at a height equal to or higher than the horizontal plane perpendicular to a vertical direction and containing the center axis when it slides on the inner circumferential surface of the cylindrical portion as the arm oscillates either by adjusting positions of a locking surface and a contact surface of a projecting portion formed on the arm and a position of a front end portion of the coil spring or by moving a position of the center axis circumferentially about an axis center of a rotational shaft of the tensioner pulley.

* * * * *